(12) United States Patent
Ahmann et al.

(10) Patent No.: US 10,721,431 B2
(45) Date of Patent: Jul. 21, 2020

(54) METHOD FOR ESTIMATING A TIMESTAMP IN A VIDEO STREAM AND METHOD OF AUGMENTING A VIDEO STREAM WITH INFORMATION

(71) Applicant: eyecandylab Corp., Los Angeles, CA (US)

(72) Inventors: Sascha Ahmann, Geisenhausen (DE); Martin Hackl, Shanghai (CN); Robin Moser, Munich (DE); Thomas Orzikowski, Veitsbuch (DE)

( * ) Notice: Subject to any disclaimer, the term of this patent is extended or adjusted under 35 U.S.C. 154(b) by 83 days.

(21) Appl. No.: 15/983,731

(22) Filed: May 18, 2018

(65) Prior Publication Data

US 2018/0352186 A1 Dec. 6, 2018

(30) Foreign Application Priority Data

Jun. 1, 2017 (EP) ..................................... 17173990

(51) Int. Cl.
*H04N 5/445* (2011.01)
*H04N 21/4223* (2011.01)
(Continued)

(52) U.S. Cl.
CPC ..... *H04N 5/44504* (2013.01); *G06K 9/00744* (2013.01); *G06T 7/13* (2017.01);
(Continued)

(58) Field of Classification Search
CPC ............... H04N 5/44504; H04N 5/232; H04N 5/23293; H04N 5/2628; H04N 21/4725;
(Continued)

(56) References Cited

U.S. PATENT DOCUMENTS

| 8,447,769 B1 * | 5/2013 | Paris ....................... G06F 16/51 |
| | | 707/758 |
| 9,230,172 B2 * | 1/2016 | Holzschneider ........ G06F 16/51 |
| | | (Continued) |

FOREIGN PATENT DOCUMENTS

| EP | 2015227 A2 | 1/2009 |
| EP | 2808805 A1 | 12/2014 |
| | (Continued) | |

OTHER PUBLICATIONS

Augmented Tv: An Augmented Reality System for TV Programs Beyond the TV Screen, Hiroyauki Kawakita et al, IEEE, 2014.
(Continued)

*Primary Examiner* — Pritham D Prabhakher
(74) *Attorney, Agent, or Firm* — Michael J. Feigin, Esq.; Feigin and Fridman LLC

(57) ABSTRACT

The invention discloses a method for determining a timestamp t of an image of a video stream V(t) comprising a plurality of images, said method comprising the steps of determining an acquired image descriptor of at least one of a plurality of acquired images Si of an acquired video stream during a display phase and determining a similarity level of an original image descriptor and the acquired image descriptor and if the similarity level of the original image descriptor and the acquired image descriptor fulfills at least one criterion, determining the timestamp t of the original image descriptor and assigning the timestamp t to the acquired image corresponding to the acquired image descriptor as an estimated timestamp T. Augmented information can be displayed to a user depending on the time stamp.

13 Claims, 10 Drawing Sheets

(51) Int. Cl.

| | |
|---|---|
| *H04N 21/43* | (2011.01) |
| *H04N 21/8352* | (2011.01) |
| *H04N 21/658* | (2011.01) |
| *H04N 21/44* | (2011.01) |
| *H04N 21/414* | (2011.01) |
| *H04N 21/4722* | (2011.01) |
| *G06T 7/38* | (2017.01) |
| *G06T 7/13* | (2017.01) |
| *G06T 7/70* | (2017.01) |
| *G06K 9/00* | (2006.01) |
| *H04N 5/232* | (2006.01) |
| *H04N 5/262* | (2006.01) |
| *H04N 21/4725* | (2011.01) |
| *G06K 9/38* | (2006.01) |
| *G06K 9/46* | (2006.01) |
| *H04N 21/41* | (2011.01) |

(52) U.S. Cl.
CPC .............. *G06T 7/38* (2017.01); *G06T 7/70* (2017.01); *H04N 5/23293* (2013.01); *H04N 5/2628* (2013.01); *H04N 21/41407* (2013.01); *H04N 21/4223* (2013.01); *H04N 21/4307* (2013.01); *H04N 21/44008* (2013.01); *H04N 21/4722* (2013.01); *H04N 21/4725* (2013.01); *H04N 21/6581* (2013.01); *H04N 21/8352* (2013.01); *G06K 9/00664* (2013.01); *G06K 9/38* (2013.01); *G06K 9/4671* (2013.01); *G06T 2207/20164* (2013.01); *H04N 21/4126* (2013.01)

(58) Field of Classification Search
CPC ......... H04N 21/2389; H04N 21/42209; H04N 21/4122; H04N 21/4126; H04N 21/4828; H04N 21/435; H04N 21/6587; H04N 21/4307; H04N 21/2387; H04N 21/816; H04N 21/8133; H04N 21/2668; H04N 21/23418; H04N 21/2383; H04N 21/237; H04N 21/6125; H04N 21/2407; H04N 21/4348; H04N 21/4622; G06T 7/13; G06T 7/70; G06T 2207/20164; G06T 2207/30204; G06T 19/006; G06T 7/0044; G06T 7/38; G09G 5/377; G09G 2340/14; G09G 2340/125; G11B 27/19; G11B 27/10; G06F 3/147

USPC .................................................. 348/231.99
See application file for complete search history.

(56) References Cited

U.S. PATENT DOCUMENTS

| | | | |
|---|---|---|---|
| 9,323,785 B2* | 4/2016 | Laxminarayana Bhat ................... G06F 16/58 | |
| 9,460,346 B2* | 10/2016 | King ................... G06F 16/5846 | |
| 9,706,102 B1* | 7/2017 | McInerny .......... H04N 5/23206 | |
| 10,033,941 B2* | 7/2018 | Williams ............... H04W 64/00 | |
| 10,198,842 B2* | 2/2019 | Korzunov ................ G06T 7/73 | |
| 2009/0180697 A1* | 7/2009 | Erol ..................... G06F 16/4393 382/218 | |
| 2012/0113142 A1 | 5/2012 | Adhikari et al. | |
| 2012/0167135 A1 | 6/2012 | Yu et al. | |
| 2013/0124508 A1* | 5/2013 | Paris ........................ G06F 16/51 707/723 | |
| 2014/0059604 A1 | 2/2014 | Kim et al. | |
| 2014/0059630 A1 | 2/2014 | Kim et al. | |
| 2014/0232748 A1 | 8/2014 | Kis et al. | |
| 2014/0254934 A1* | 9/2014 | Laxminarayana Bhat ................... G06F 16/58 382/173 | |
| 2014/0317659 A1 | 10/2014 | Yasutake | |
| 2015/0185017 A1* | 7/2015 | Kreider ................. G06T 3/0006 382/165 | |
| 2015/0195626 A1 | 7/2015 | Lee et al. | |
| 2016/0307371 A1 | 10/2016 | Ayers et al. | |
| 2017/0287187 A1* | 10/2017 | Korzunov ................ G06T 7/73 | |
| 2018/0205926 A1* | 7/2018 | Mogalapalli ............ G06T 7/521 | |

FOREIGN PATENT DOCUMENTS

| | | |
|---|---|---|
| WO | 2015108243 A1 | 7/2015 |
| WO | 2016012044 A1 | 1/2016 |

OTHER PUBLICATIONS

"Visual SyncAR break the fourth wall, brings TV content into your living room", https://www.youtube.com/watch?v=8NHw9Wu0CLw, Published Feb. 18, 2013.

"Mobile Visual Search", Bernd Girod et al, IEEE Signal Processing Magazine, Jul. 2011.

* cited by examiner

METHOD FOR ESTIMATING A TIMESTAMP IN A VIDEO STREAM AND METHOD OF AUGMENTING A VIDEO STREAM WITH INFORMATION

The present invention relates to a method of estimating a timestamp of a video stream that is displayed on a display device and acquired by a camera. The present invention also relates to augmenting a video stream with information.

There is a need to augment a video stream displayed by the display device with additional information. Such additional information may be displayed on a handheld device, smart glasses and/or a wearable device.

PRIOR ART

US 2009/0237546 A1 discloses that an image of an object is captured using a portable electronic device. The image is displayed on a display screen of the portable electronic device. Image recognition is performed on the image to identify the object, a task associated with the identified object is identified, and information about the task is displayed on the display screen of the portable electronic device along with the image.

US 2009/0102859 A1 discloses apparatus and methods for providing a user augmented reality (UAR) service for a camera-enabled mobile device, so that a user of such mobile device can use the mobile device to obtain meta data regarding one or more images/video that are captured with such device. As the user points the mobile device's camera at one or more objects in one or more scenes, such objects are automatically analyzed by the UAR to identify the one or more objects and then provide meta data regarding the identified objects in the display of the mobile device. The meta data is interactive and allows the user to obtain additional information or specific types of information, such as information that will aid the user in making a decision regarding the identified objects or selectable action options that can be used to initiate actions with respect to the identified objects. The user can utilize the UAR to continuously pass the camera over additional objects and scenes so that the meta data presented in the display of the mobile device is continuously updated.

CN 1578414A discloses a method and apparatus for measuring the position and orientation.

CN 1865843A discloses a method with different type labels to estimate position information comprises: detecting labels from variable images to calculate approximately target projected position on image surface, then obtaining the correction value to reduce the position error, and calculating label position information.

US 2011/0214082 A discloses an interactive head-mounted eyepiece with an integrated camera facility that images an external visual cue. An integrated processor of the eyepiece identifies and interprets the external visual cue as a command to display content associated with the visual cue.

CN 102214000 B discloses a system for mobile augmented reality target object hybrid registration method and system, the method of the following steps: 1) Get the current location information and the target object information; 2) based on the current attitude toward mobile devices and data acquisition mobile device is currently the target object and target objects appearing in the screen corresponding to the screen coordinate value; 3) Get the current global motion parameters of the mobile device based on the current continuous image of the scene of the mobile device; 4) according to the global motion parameter adjustment of mobile devices in real-time screen coordinate value registration information for each target object screen appears corresponding to the current. The system includes a mobile device, the mobile device comprises a sensor unit, the sensor information processing unit, an image acquisition unit, the visual information processing unit and the mixing unit register.

CN 103428442 A relates to an apparatus and method of video comparison. A video comparison apparatus for sports coverage comprises a video input arranged in operation to receive video frames of captured video footage from a video camera having a fixed viewpoint of a scene, the video frames being associated with respective times referenced to a universal clock, a control input arranged in operation to receive event data indicating that an event has occurred, the event being associated with a time referenced to the universal clock, a video processor, and a video compositor; and the video processor is operable to select two or more instances of video footage associated with universal times responsive to the universal times of two or more instances of the event, and the video compositor is operable to superpose onto successive video frames of one instance of selected video footage at least a first part of a corresponding video frame from each of the one or more other selected instances of video footage.

JP 2011-118724A discloses an electronic device comprising a photographing image acquisition unit that acquires a photographing image obtained by photographing an actual space by an imaging unit; a display unit that displays the photographing image; a detection unit that detects and identifies a marker M included in the photographing image; a location calculation unit that calculates a relative location and pose between the imaging unit and the marker M; a virtual imaging unit arrangement unit that arranges a virtual imaging unit at a prescribed location in a virtual space; a reading unit that refers to a storage unit on the basis of a procedure selected by a selection unit to read a corresponding virtual object and location information on the corresponding virtual object; a rendering unit that arranges the virtual object in the virtual space according the location information, and photographs inside the virtual space; and an overlapping unit that overlaps a result photographed in the rendering unit on the photographing image.

SUMMARY OF THE INVENTION

It is an object of the present invention to provide a method for estimating a timestamp of a video stream displayed on a display device and acquired by a camera. It is also an object of the present invention to augment a video stream with information.

The object of the invention is achieved by a method for determining a timestamp of an image of a video stream according to claim 1, a method of augmenting a displayed video stream according to claim 13 and a method of augmenting an original video stream with information. The depending claims relate to preferred embodiments.

The method for determining a timestamp of an image of a video stream V(t) comprising a plurality of images comprises the step of receiving a plurality of original image descriptors at a monitoring unit, such as by a network. Each original image descriptor is associated to an image in the original video stream. The original image descriptors are generated during a preparation phase before displaying the original video stream V(t) on a display device during a display phase. The method further includes the step of acquiring an acquired video stream by an acquisition device of the monitoring unit by acquiring images Si of the display device on which the original video stream V(t) is displayed. The method determines an acquired image descriptor of at least a portion of at least one of a plurality of acquired images Si of the acquired video stream during the display phase. Then, the method determines a similarity level of an original image descriptor and the acquired image descriptor. If the similarity level of the original image descriptor and the acquired image descriptor fulfills at least one criterion, the method determines the timestamp t of the original image descriptor and assigns the timestamp t to the acquired image corresponding to the acquired image descriptor as an estimated timestamp T.

In other words, during a preparation phase original image descriptors of images of a video stream are determined. The image descriptors are transferred to a monitoring unit. The monitoring unit acquires the video stream V(t) displayed on a display device with an image acquisition device, such as a camera. Acquired image descriptors are determined based on the acquired video stream. The method determines, which original image descriptor corresponds to the acquired image descriptor. If an appropriate similarity level has been determined between the acquired image descriptor and the original image descriptor, the timestamp of the original image descriptor is assumed to be the timestamp of the acquired image.

The method further comprises the step of determining the uniqueness level of the acquired image. The acquired image descriptor and the estimated timestamp T are stored as a candidate point in a list comprising a plurality of candidate points. If the number of candidate points exceeds a predetermined number, the candidate point with the lowest uniqueness level is removed from the list of candidate points. The candidate points having the highest uniqueness level may be used for determining the acquired image descriptor, which is used for determining the similarity level between the acquired image descriptor and the original image descriptor.

The step of determining the uniqueness level of the acquired image descriptor includes the step of comparing the acquired image descriptor with the acquired image descriptors of a plurality of neighboring images. In one embodiment the list of candidate points includes 8 to 12 points, preferably 10 points. Confident results start to appear after the 20th processed acquired image.

The method further comprises the step of determining the candidate point of all candidate points in the list with the highest uniqueness level $\omega i$. The timestamp T is determined on basis of the candidate point having the highest uniqueness level $\omega i$. The similarity level of the acquired image descriptor of the acquired image having the highest uniqueness level is compared with the original image descriptors. Thereby, the robustness of the estimation of the timestamp T can be increased.

The step of determining the uniqueness level $\omega i$ of the acquired image descriptor of the acquired image may include the step of analyzing the variance of the timestamp Ti associated with the acquired image Si, the step of determining the inverse standard deviation of the timestamp Ti associated with the acquired image Si and/or determining the inverse standard deviation of the time stamp Ti associated with the acquired image Si based on the median of the timestamp Ti associated with the acquired image Si.

The timestamp T0 of the starting point of the acquired video stream may be determined by the formula $$T0=T^*-t^*;$$

wherein
T* is the timestamp of the acquired image; and
t* is the timestamp of the corresponding original image corresponding to the acquired image having the time stamp T*.

The timestamp T0 is an estimation of the starting point of the acquired video stream, which is updated by the member of the list of candidates having the highest uniqueness level. Thereby, estimation of the starting point of the video sequence T0 can be updated regularly.

In this case, the timestamp Ti of the starting point of the acquired video stream is determined by the formula $$T0=T^*-t^*;$$

wherein
T* is the timestamp of the acquired image corresponding to the candidate point having the highest uniqueness level; and
t* is the timestamp of the original image corresponding to the acquired image having the timestamp T*.

In one embodiment, the uniqueness level may be determined by the step of calculating a distance function $$Di(t|,V(t),Si);$$

wherein
t is the timestamp of the original video stream;
V(t) is the original video stream; and
Si is the acquired image.

The term distance function may also include a shifted distance function. The distance function may be generated by the image descriptor. Distance function may also be generated by an image descriptor.

In one embodiment the candidate point (S*, T*) having the highest uniqueness level of all candidate points (Si, Ti, i=1, . . . , n) may be included by the step of minimizing the functional $$J(t)=\Sigma \omega i\, Di(t|V(t),Si),\, i=1,\ldots,n;$$

wherein
S* is the image having the highest uniqueness level of all candidate points;
T* is the timestamp of the image having the highest uniqueness level of all candidate points;
Si is the image i; and
Ti is the timestamp of the acquired image i.

The functional J(t) is a function of functions. By minimizing the functional J(t), a criterion of optimization for finding the starting point of the video stream V(t), namely T0 is reformulated.

In the context of the present invention the step of determining an acquired image descriptor comprises any step providing abstract or generic information for distinguishing images, such as orientation of edges, extracted features, contrast, contrast distribution, edge-distribution, brightness, brightness-distribution, colour, colour-distribution and the like. Particularly the step of determining an acquired image descriptor may comprise the step of performing an image histogram equalization, detecting local feature points, calculating local feature descriptors, calculating a vector of locally aggregated descriptors and/or decreasing the dimension of the locally aggregated descriptors.

Before the image descriptor can be calculated by the monitoring unit, the display device and the orientation thereof has to be detected by the mobile unit. Therefore, the method may comprise the step of detecting the corners of the display device by image processing, detecting the orientation of the display device by determining the orientation of the mobile unit by gyroscopic data of the mobile unit, detecting the edge of the display device, determining the orientation of the display device, and/or transforming the orientation of the captured video stream to the orientation of the mobile unit. Thereby, the misalignment between the image acquisition device of the mobile unit and the display device that influences the image descriptors may be reduced.

The image descriptor is preferably only determined from the portion of the acquired image that depicts the displayed original video stream. The method further includes the step of extracting the acquired image of the acquired video stream from the captured image of the captured image stream, wherein the acquired image corresponds to the portion of the captured image that depicts the original video stream. The step of extraction may be based on the step of detecting the corners of the display device, detecting the orientation of the display device, detecting the edge of the display device, determining the orientation of the display device and/or transforming the orientation of the captured images.

The original video stream may be a television signal stream. The original video stream may be a broadcast signal or a multicast signal. The display device may be a television set and/or a display monitor. The monitoring device may be a mobile computer and the acquisition device may be a camera of the mobile computer. The mobile unit may be a tablet computer and the acquisition device is a camera of the tablet computer. The monitoring unit may be a smart phone and the acquisition device is a camera of the smart phone. The monitoring unit may be data glasses and the acquisition device is a camera of the data glasses. The monitoring unit may be a wearable device.

The invention also relates to a method of augmenting a displayed video stream by displaying information comprising the step of determining a timestamp T of an image of an original video stream V(t) as described before. The method further comprises the step of receiving at the mobile unit at least one information that is displayed at at least one display timestamp Td of the original video stream V(t). The information is displayed at the mobile unit, if the mobile unit determines that the image corresponding to the display timestamp Td of the original video stream V(t) is displayed on the display device. The information may relate to an image or part of an image displayed on the display device.

The invention also relates to a method of augmenting an original video stream V(t) with information comprising the step of determining a plurality of original descriptors, wherein each original image descriptor is associated to an original image in the original video stream and wherein the original image descriptors are generated during a preparation phase. The method further comprises the step of assigning the information to at least one image during the preparation phase. The method further comprises the step of storing the original image descriptors and the information in a storage device. The term storing the information may also comprise the step of storing a link to the information, an index to the information, a hash value for retrieving the information or the like.

The step of determining an acquired image descriptor may comprise the step of performing an image histogram equalization, detecting local feature points, calculating local feature descriptors, calculating a vector of locally aggregated descriptors and/or decreasing the dimension of the locally aggregated descriptors.

BRIEF DESCRIPTION OF THE DRAWINGS

The invention is now described in further detail with reference to the drawings showing exemplary and non-limiting embodiments, wherein.

DETAILED DESCRIPTION OF THE INVENTION

Figure 1:
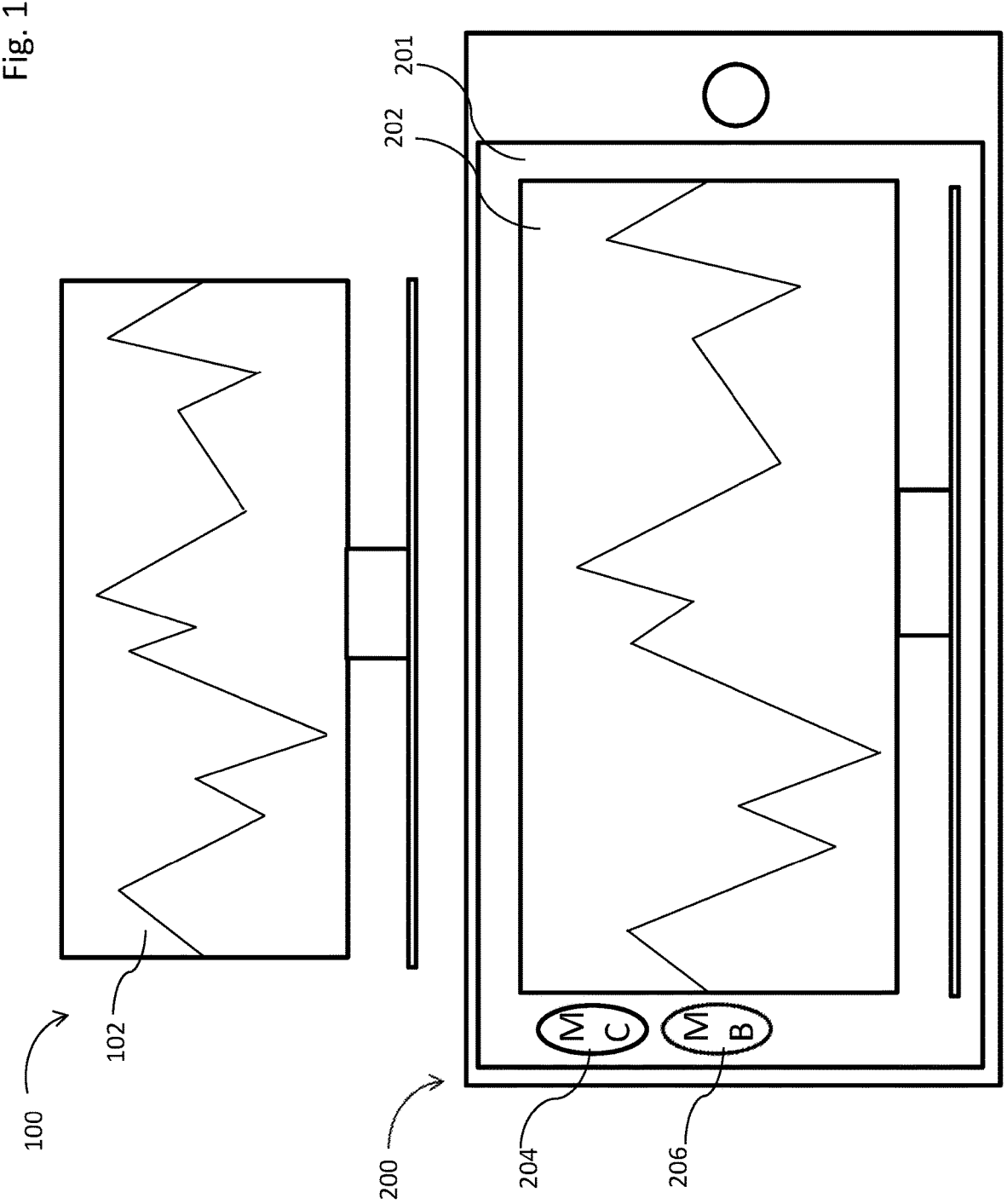
FIG. 1 shows a general overview over an embodiment of the present invention.

With reference to FIG. 1 the general application of the present invention is described. A television set 100 (display device) displays a video stream V(t) 102 to a user. The scenario depicted by the television set (original video stream, original images) shows a scene with mountains.

The user may direct the camera of a mobile device (monitoring unit) 200, such as a smartphone, a tablet computer, data glasses or the like to the television set 100. The inventive method analyzes the scene 202 acquired by the camera of the mobile device 200. On the screen 201 of the mobile device 200 additional information, i.e. augmented information, is provided. For example, two active buttons 204, 206 are provided, wherein the button 204 comprises a link to information relating to mountain climbing and the button 206 is a button relating to mountain biking. If the user presses one of the buttons 204, 206 additional information about mountain climbing and mountain biking is provided. The embodiment shown in FIG. 1 shows the present invention during a presentation phase.

The provider of the video stream can define the augmented information 204 and 206, which can be accessed by the mobile device 200.

Figure 2:
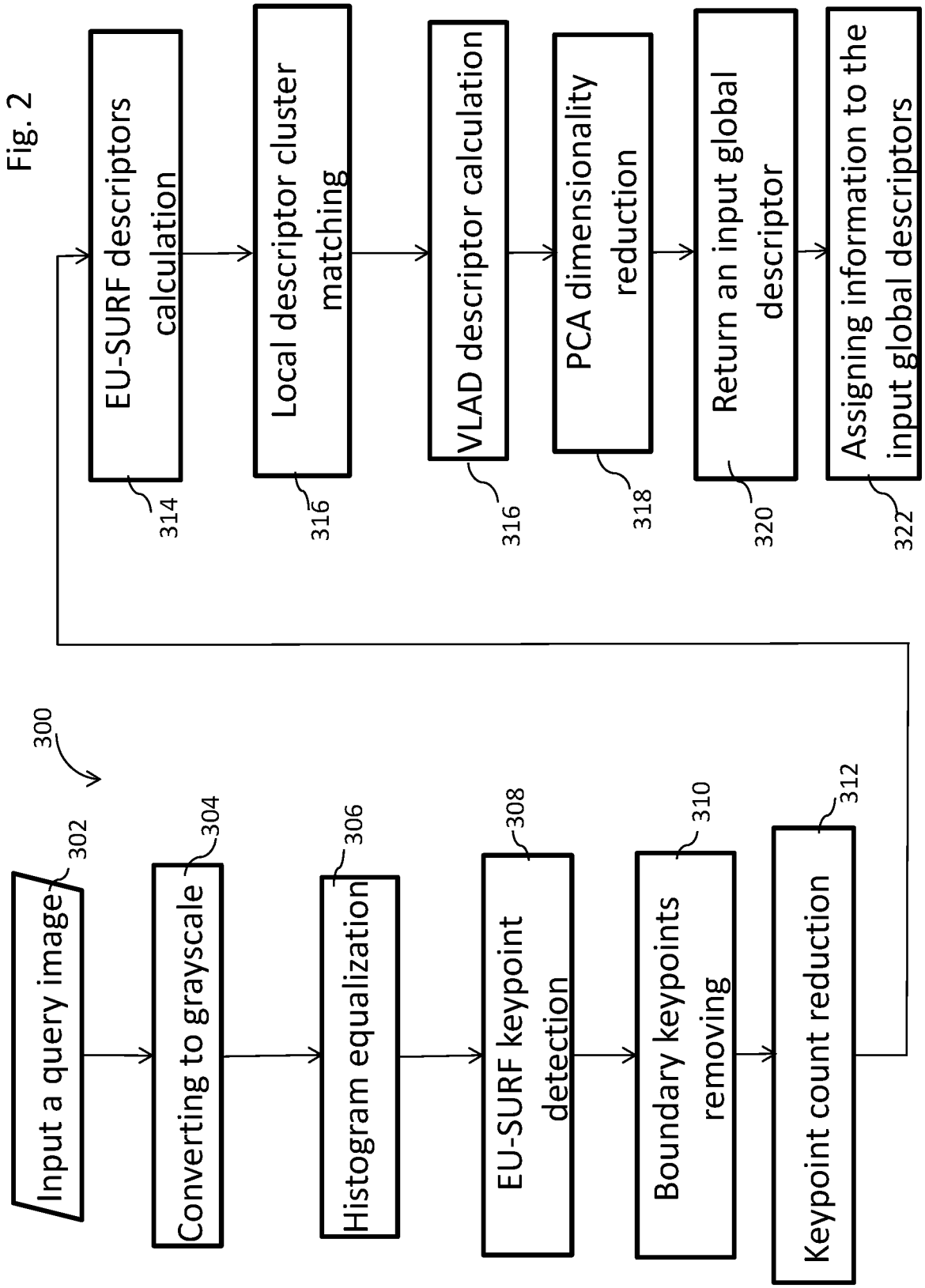
FIG. 2 shows a flow chart of the method during a learning stage.

With reference to FIG. 2, the steps of the inventive method during the preparation phase is explained. The method 300 of augmenting an original video stream with information is carried out by the provider of the original video stream before broadcasting or multicasting the original video stream.

The method 300 of augmenting an original video stream with information is commenced by the step of inputting a query image (original image) 302. The video stream may be discretized into frames before inputting the query image. A preferred rate is ¹⁄₂₅ s as a frame rate.

In step 304 the query image is converted into a gray scale and in step 306 histogram equalization is done.

In step 308 a key point detection is performed by the so-called EU-SURF-method (Extended Upright Speeded Up Robust Features).

In step 310 the boundary key points are removed. In step 312 the count of key points is reduced. In step 314 the EU-SURF descriptors are calculated.

In step 316 the local descriptor cluster matching is determined.

In step 316 the VLAD (vector of locally aggregated descriptors) descriptors are calculated. In step 318 the PCA (Principal Component Analysis) dimensionality is reduced.

In step 320 the method returns an input global descriptor of the query image (original image).

In step 322 information to be displayed during a presentation phase of the original video stream can be assigned to the input global descriptors.

The above method 300 can be summarized as follows. In a first step the video stream is discretized in some corpus into frames by uniform sampling, such as a sampling rate for 1/25 seconds. Thereafter, the local SURF-descriptors are retrieved from the video, wherein the SURF-descriptors are thinned and clustered by the k-means-algorithm. The usual step of uniform thinning is 20. Thereafter, long VLAD-descriptors are calculated for all frames from the corpus of the video stream. Finally, the VLAD-descriptor is sampled usually with a step of 25 and matrices for PCA are estimated by the SVD (singular value decomposition) algorithm. The clusters and PCA matrices are stored into a file with common retrieving data. For the video stream the VLAD descriptors are calculated for each sampled frame and stored into the file. Because of the uniform sampling rate there is no need for explicitly storing the timestamp.

The list of input global descriptors of the original video stream and the information assigned to the descriptors may be stored in a data base and retrieved by the mobile device 200. Thereby, the preparation phase is completed.

Figure 3:
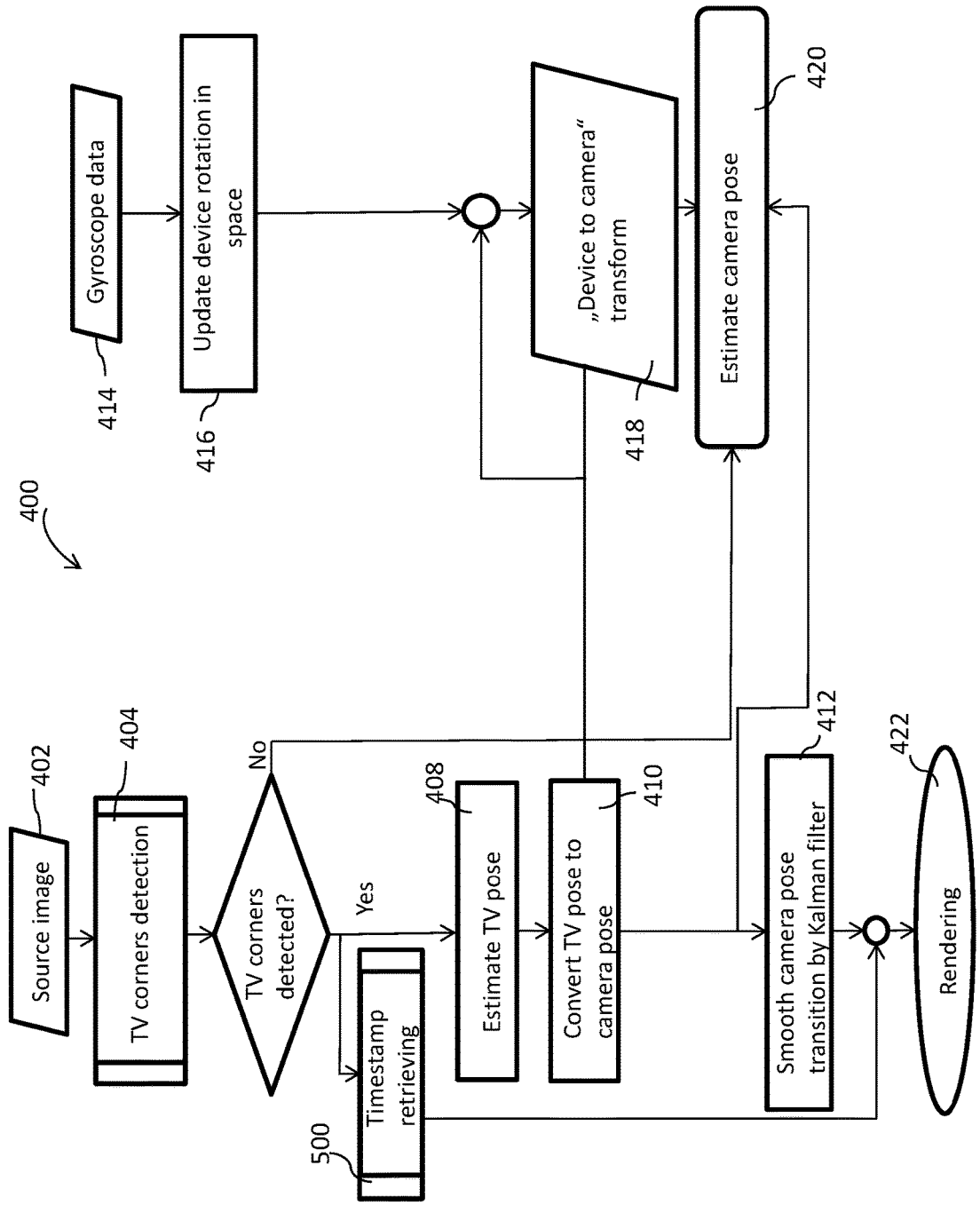
FIG. 3 shows a flow chart of the method during a display phase.

FIG. 3 shows a flowchart of the inventive method during the presentation phase. During the presentation phase a mobile device 200 (monitoring unit), such as a smartphone, tablet, data glasses or the like, runs an application for augmenting the original video stream with information. The user directs the camera of the mobile device to the television screen and/or display device that shows the video stream. On the display of the mobile device interactive, static and eyecandy effects are displayed that augment the video stream. This augmented information can be a visually appealing, informal and/or requesting action.

The inventive method executed by the monitoring unit 200 needs to know, where the display device displaying the video stream V(t) is located. Further, the inventive method needs to determine at which angle the display device is located in relation to the acquisition device of the monitoring unit 200. Finally, the inventive method has to determine, which timestamp the original image 102 displayed on the display device 100 has.

FIG. 3 shows a flowchart of the method according to the present invention for retrieving a timestamp. In step 402 the method receives a source image, i.e. an acquired image. In step 404 the corners of the display device are detected. In step 406 it is determined, whether the corners of the display device have been detected. If the corners of the displaying device have been detected, the position and/or orientation of the display device is determined in step 408. In step 410 the acquired video stream is converted into the orientation of the camera of the monitoring unit 200. Thereafter, in step 412 the transition into the camera pose is smoothed by a Kalmam filter.

If the method determines in step 406 that the corners of the display device could not be detected, the method uses the gyroscope data 414 of the gyroscopic sensor of the monitoring device 200. Thereby, the location of the camera of the monitoring device 200 can be determined in step 416. In step 418 a transformation from the device coordinate system to the camera coordinate system is performed based on the updated device rotation in space as determined by step 416 and the preceding camera pose to the display device as determined in step 410. Thereby, in step 420 the orientation of the camera of the monitoring unit 200 with respect to the display device 100 can be estimated.

In step 420 the pose estimation algorithm of one embodiment estimates transforms (position and rotation) of the display device 100 in its arbitrary coordinate system. But for rendering the embodiment of the method needs to update unity camera transform in the unity coordinate system. Thus, the method needs, to convert the first one to the second one, e.g. from the camera coordinate system to display device coordinate system.

In step 416 the gyroscope data (rotation angles) need to be "calibrated" in order to be used together with the camera transform. Then, the embodiment of the method just stores calibrated values for the further usage ("update" corresponding variables). As to step 418 similarly as in step 410, the device and the camera of the monitoring device 200 do not have the same coordinate systems. But in this case the embodiment of the method calculates and remembers a transform difference between them in step 418, and use it, if pose estimation of the display device according to step any one of steps 404, 406, 408, 410 and 412 fails next time, e.g. with the next acquired image.

In step 420 the embodiment of the invention uses the current rotation value of the monitoring unit 200 as determined in step 416 and the last remembered transform difference as determined in step 418 to estimate current camera transform.

Thereafter, the camera orientation transition is smoothed by the Kalman filter in step 412.

After step 412 the acquired video stream is rendered into the desired orientation.

If the method determines in step 406 that the corners of the display device 100 have been detected, the method 400 also performs the step of retrieving a timestamp 500, explained below in further detail.

Figure 4:
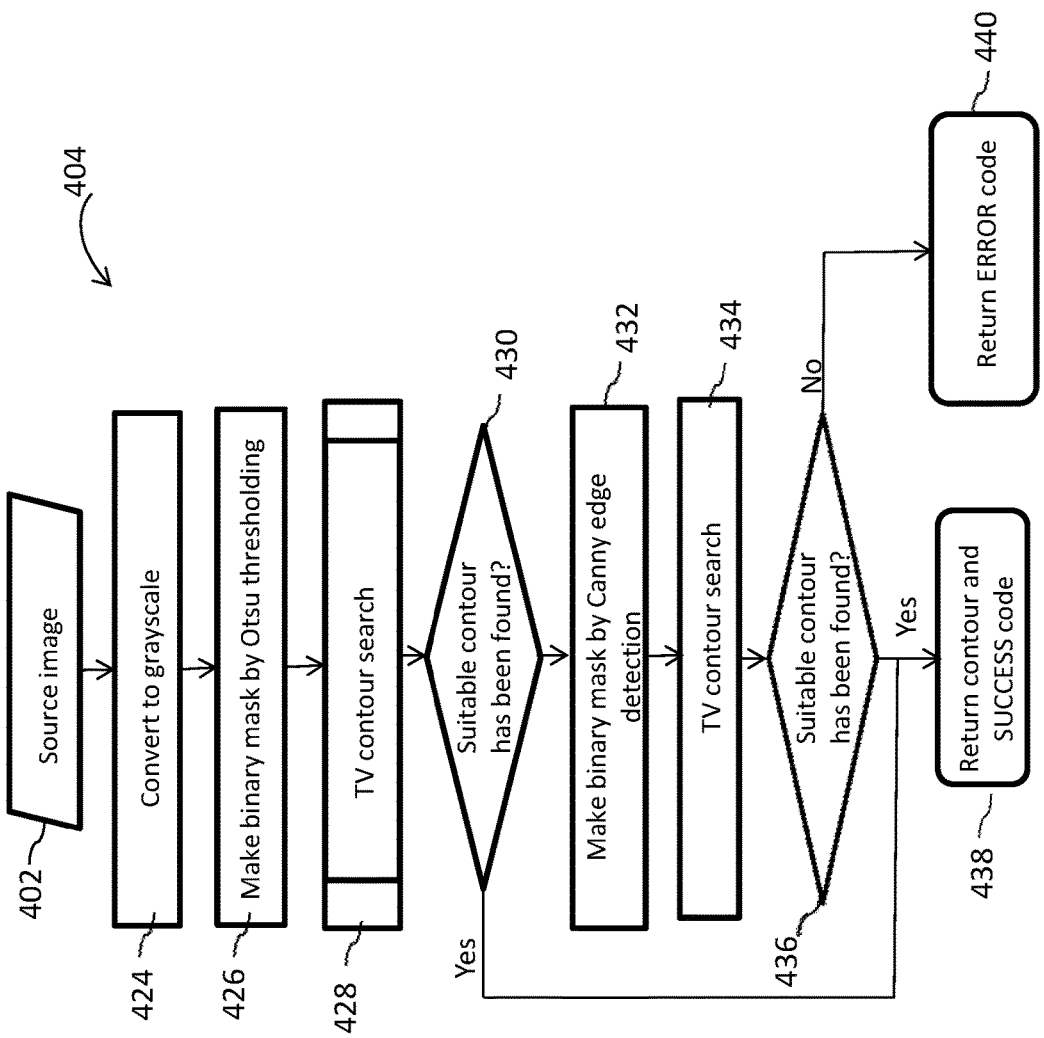
FIG. 4 shows a flow chart of the steps of detecting the corners of a display device in more detail.

The corner detection 404 is now described more detailed with reference to FIG. 4. The source image 402 is input for the steps of corner detection 404. In step 424 the source image (captured image) is converted into a great scale. Corner detection requires a white border around the video on the display device 100. The border width should be 1/36 of the video frame height. For example a border having 30 pixel should be used for a resolution of 1920×1080 and 10 pixel for the resolution of 640×360. The input image has to be converted into a binary image. For converting the input image 402 into a binary image the Otsu thresholding or the Canny-edge-detection may be used. If the simpler detection with the OTSU mask as performed in step 426 fails, as determined in step 430, the more calculation intensive Canny-edge-detection is performed in step 432. The contours of the display device are searched in steps 428 following step 426 or step 434 following step 432.

After all contours in the image are found, the algorithm picks the biggest edge and verifies, whether this contour is appropriate to consider it as a frame being a display device. Since both binarization methods can produce false positives, many heuristics such as point count, area size, convexity, distance to imaged sites, angles, aspect ratios or the like are used during contour checks, to minimize false-positive detections. False-positive detections lead to animation jittering and is not suitable for the following steps. If a suitable contour for the display device 100 has been found in steps 430 following step 428 or in step 436 following step 434 the contour is returned accompanied by a success code. Elsewise, an error code is returned in step 440.

The Otsu's method according to step 426 is widely used in computer vision and image processing to automatically perform clustering—based image thresholding or the reduction of a grayscale image to a binary image. The algorithm assumes that the image contains two classes of pixels following a bi-modal histogram, i.e. foreground pixels and background pixels. It then calculates the optimum threshold separating the two classes so that their combined spread (inter-class variance) is minimal or equivalent (because the sum of pairwise squared distances is constant) so that their inter-class variance is maximal.

With the present invention, the white border around the original video stream 102 is considered to be the foreground and all other pixels are the back ground. Despite the fact that Otsu's method is fast and robust in typical cases, it suffers from non-optimal video recording conditions or other very bright objects in a captured image. For example, a bright window or other light sources visible to the camera of the monitoring device 200 may disturb the Otsu's method, since such objects may be considered as foreground. In such cases Otsu's method cannot be performed appropriately.

The Canny edge detector according to step 432 uses a multi-stage algorithm to detect a wide range of edges in images. Canny's edge detector uses the calculus of variations, a technique which finds the function which optimizes a given functional. The optimal function in Candy's detector is described by the sum of four exponential terms, but it can be approximated by the first derivative of a Gausian. Among the edge detection method developed so far, Canny's edge detection algorithm is one of the most strictly defined methods that provides good and reliable detection.

With the method of the present invention the Canny's edge algorithm is used to find the edges between the frame of the display device 100 and the white border of the video stream 102. Canny's algorithm has proven that it can work in conditions, in which the Otsu's method failed, because it relies on image gradient and not on the value of the pixels, but also on its neighboring pixels. However, it requires more computational power and can produce more false positives.

The pose-estimation according to step 408 works in 3D-space and requires the intrinsic parameters of the camera of the monitoring device 200, such as field of view, focal length of the captured images size, and the size in pixels of the display device 100. The estimated pose comprises a position vector (X, Y and Z coordinates) and a rotation vector (three Euler angles to be applied on the axis Y, Z and X in that order).

The pose-estimation according to step 408 returns a translation vector and a 3×3 rotation matrix which can be converted to the Euler angles representation.

For augmented reality applications showing a computer graphic interface, it is usually more suitable when the camera is moving around in the scene, and the scene itself stands mostly still. Our pose estimation approach calculates a display device 100 pose relative to the camera of the monitoring unit 200. Therefore we need to convert it to the camera pose relative to the scene with display device, taking into account possible differences between coordinate system of our pose estimation algorithm and the target rendering engine. This conversion also takes into account camera intrinsic parameters and the rendered image size.

After applying the converted camera pose (projection matrix), the display device is expected to be in the coordinate systems origin, i.e. its corner with the smallest coordinates should be placed to zero and have the same size, which is used during TV/Screen pose estimation stage.

Due to limitations in calculation accuracy, rendered animations could suffer from jittering. Also, corner detection of the display device could fail on some frames during the video stream. Therefore, a batch of algorithms is used to minimize the influence of such conditions on the rendering and animations.

Camera pose prediction is used, when corner detection or pose estimation fails on a frame. Data from device sensors (gyroscope, accelerometer) is used to obtain device rotation in space. Then the device rotation is converted to the camera rotation using their correspondence obtained during previous frames.

Pose fluctuation smoothing is used to prevent scene jittering. The smoothing algorithm is based on the linear Kalman filter(6)—an algorithm that uses a series of measurements observed over time, containing statistical noise and other inaccuracies, and produces estimates of unknown variables that tend to be more accurate than those based on a single measurement alone, by using Bayesian inference and estimating a joint probability distribution over the variables for each timeframe.

Figure 5:
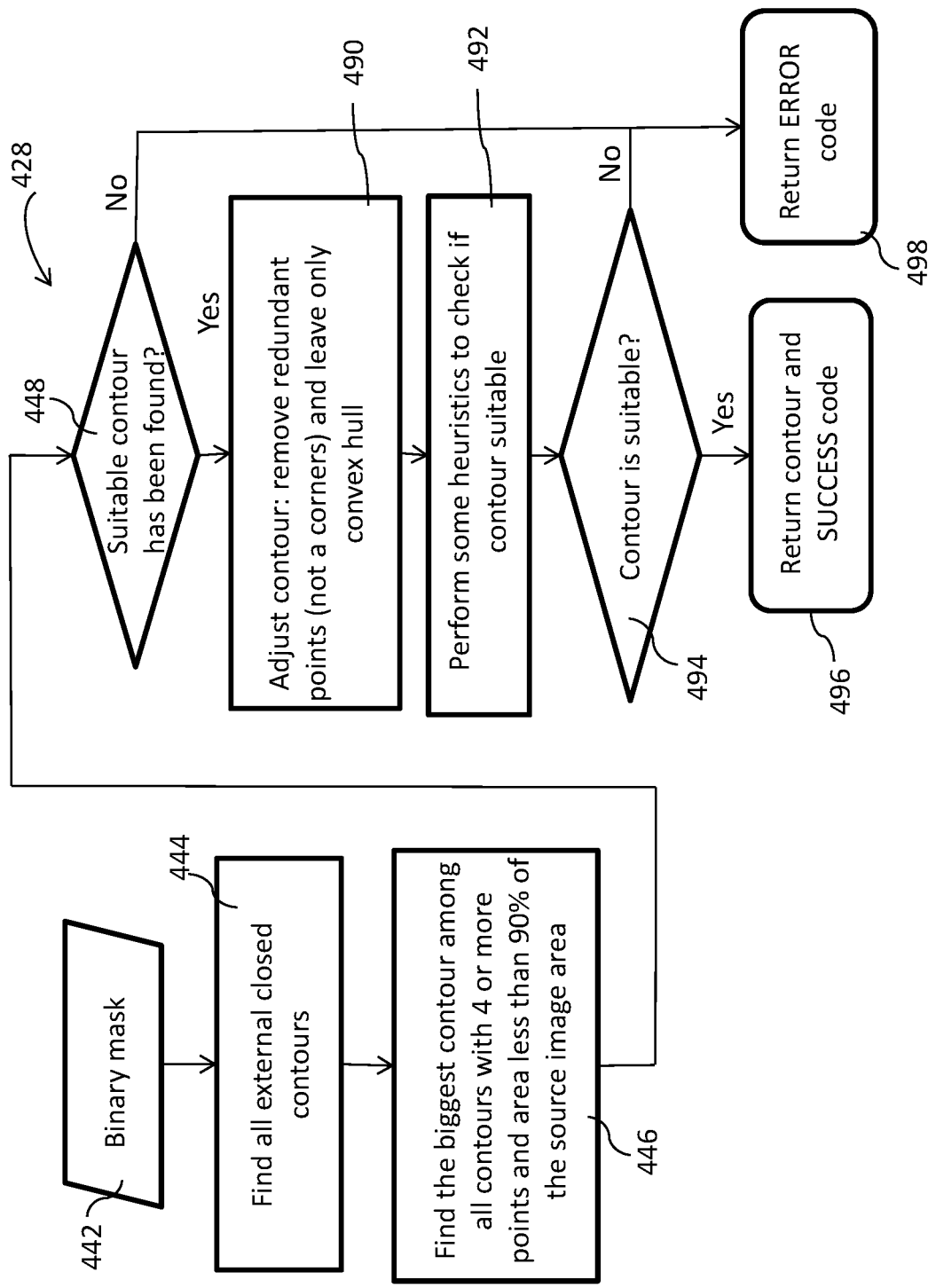
FIG. 5 shows a flow chart of the steps of a contour search in more detail.

FIG. 5 shows the contour search of steps 428 and 434. In a first step 442 a binary mask is applied, which can be either the Otsu's thresholding of step 426 or the Canny's edge detection of step 432. In step 444 all external closed contours are searched. In step 446 the biggest contour among all contours with four or more points and an area less than 90% of the source image area are searched. If no suitable contour has been found, an error code is returned in step 498. If a suitable contour has been found, redundant points are removed, but no corner points are removed. Thereby, a convex hull is achieved in step 490. In step 492 heuristics are performed, to verify, whether the found contour is suitable. If the found contour is suitable, the contour and a success code are returned in step 496. Elsewise, an error code is returned in step 498.

Figure 6:
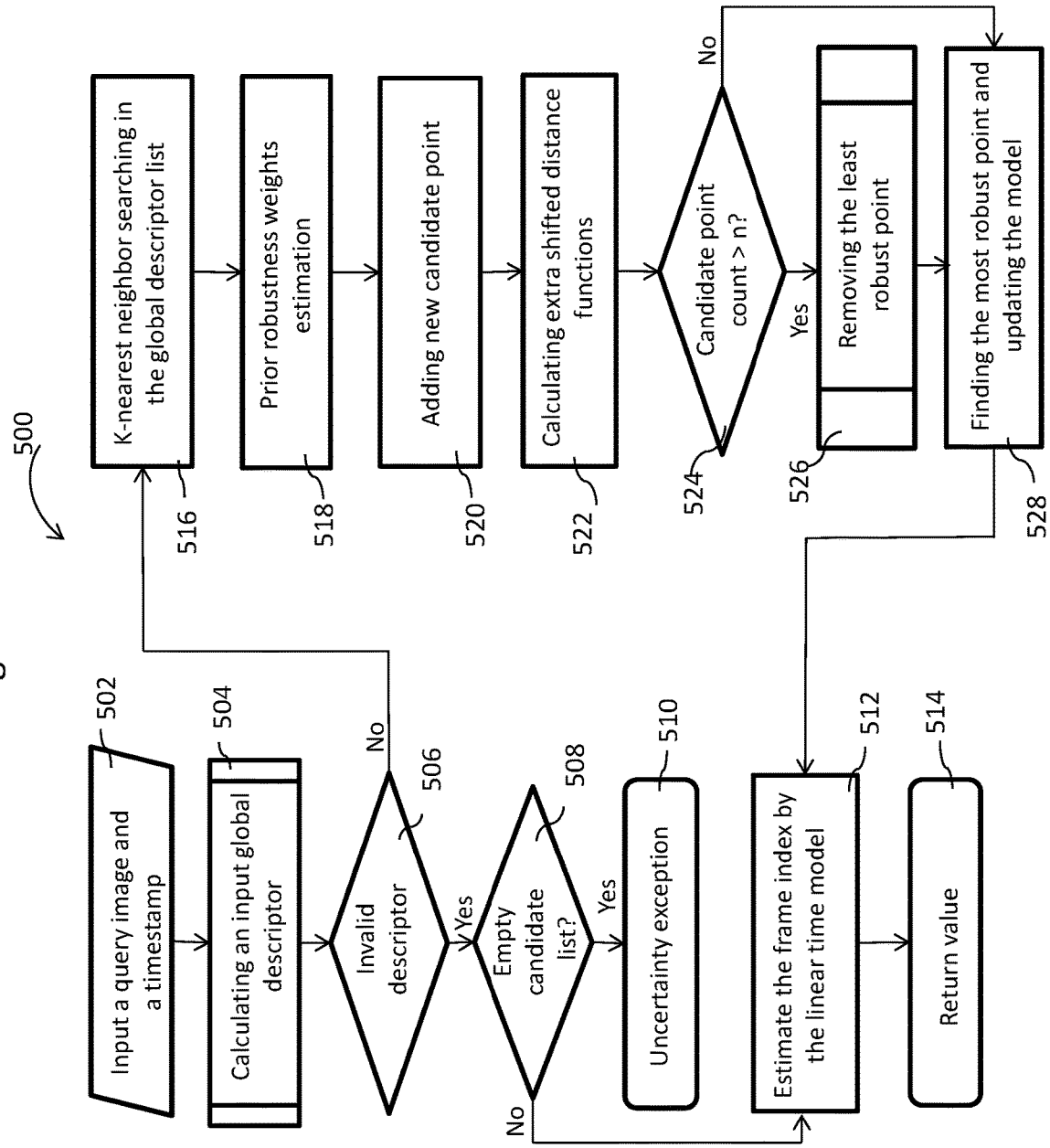
FIG. 6 shows a flow diagram of the timestamp retrieval.

With reference to FIG. 6 the retrieval or estimation of the timestamp of the video stream is explained. In step 502 an acquired image and a time span is input into the method 500. The estimation of the timestamp of the video stream starts in the time reference system of the observing system, i.e. the monitoring unit 200. The method forms a mathematical observer, which estimates one unobservable parameter in a dynamic system. The method creates a filter (candidate list) for a sequence of acquired images with corresponding timestamps in the observing time reference system. The filter contains a base with a reference query images (candidate images). These reference images (candidate images) are the most robust images among all processed images and form the list of candidate images. The method tries to estimate the timestamp T0 of the beginning of the video stream by detecting the most robust acquired images among the reference images and the timestamp T* in the reference system of the original video stream (in the reference system of the display device 100) of the minimum of the corresponding distance function in the space of some global image descriptors. If the most robust acquired image has the timestamp t* in the observing time reference system, then the required timestamp is T0=T*−t*.

In step 504 the method of the present invention calculates an input global descriptor. A global image descriptor is a quite simple description of a video frame, which is robust to a given set of distortions (blurring, white balance changing, affine transformations and so on), and which allows to distinguish similar frames from non similar ones. Due to computational limitations one embodiment of the method relies on the well known VLAD descriptors. In one embodiment the VLAD descriptor is calculated for a video frame in accordance with the following scheme:
1. Image histogram equalization is made.
2. The method detects local feature points by the SURF algorithm without increasing robustness to rotations (for speed up). The threshold for hessian keypoint detector is set to 400. Preferably, 512 points with the highest scores are selected.
3. Then local feature descriptors are calculated by the SURF algorithm. One embodiment uses extended SURF descriptors. In this case a local descriptor is a 128-length float vector.
4. Thereafter, the method calculates a VLAD descriptor for this set of local descriptors and 256 clusters. This results in a global descriptor as a 32768-length float vector. This vector is normalized by square-rooting and global normalization.
5. Finally, the dimension of the VLAD descriptor vector is decreased to a 128-length vector by the PCA algorithm.

The distance function (in the space of global descriptors) is a real function D(t|V,S), where t is a time in the time reference system of the display device 100, V(t) is a video dip, S is a screenshot (an acquired image with same resolution as that of the frame of video). This function returns small values for times of frames, which are similar to the screenshot, and large values for other times (and frames). If S is really correspondent to some frame $F_t$ with time t, and doesn't contain big distortions, then D(t) will be a minimum (at least local minimum, if video clip has repeated scenes).

If screenshot $S_1$ has distance function D(t|V,$S_1$) with a more distinct minimum at corresponding time than screenshot $S_2$ (in its corresponding time), then $S_1$ is a more robust screenshot than $S_2$. The robustness is affected by the amount of distortions, the temporal length of the scene, which includes the corresponding frame, the presence of recurring scenes, and many other factors (see possible distance functions for one screenshot in the following diagram):

In step 506 the method according to the present invention determines, whether the descriptor is invalid. If the descriptor is not invalid, the method according to the present invention proceeds to step 516, in order to search the k nearest neighbors in the global descriptor list. In step 520 the image descriptor Si and timestamp Ti are stored as a new candidate point in the list of candidates. In step 522 an extra shifted distance function is calculated.

In step 518 the robustness of an acquired image and the corresponding timestamp is estimated. The most robust point ($S_*,T_*$) (screenshot with timestamp in the observing time reference system) among n points ($S_i,T_i$, i=1, . . . , n) can be detected by searching minimum of the functional J(t), where $w_i$ is a weight coefficient determining prior estimation of robustness. After finding the minimum we select a point ($S_j,T_j$), whose shifted distance function D($t_*-T_j$|V,$S_j$) value is minimal. This point is the most robust point. A point with the maximal value of the shifted distance function at time $t_*$ is the least robust point. The distance functions and shifted distance functions for various acquired images are shown in FIGS. 7 to 9.

Figure 7:
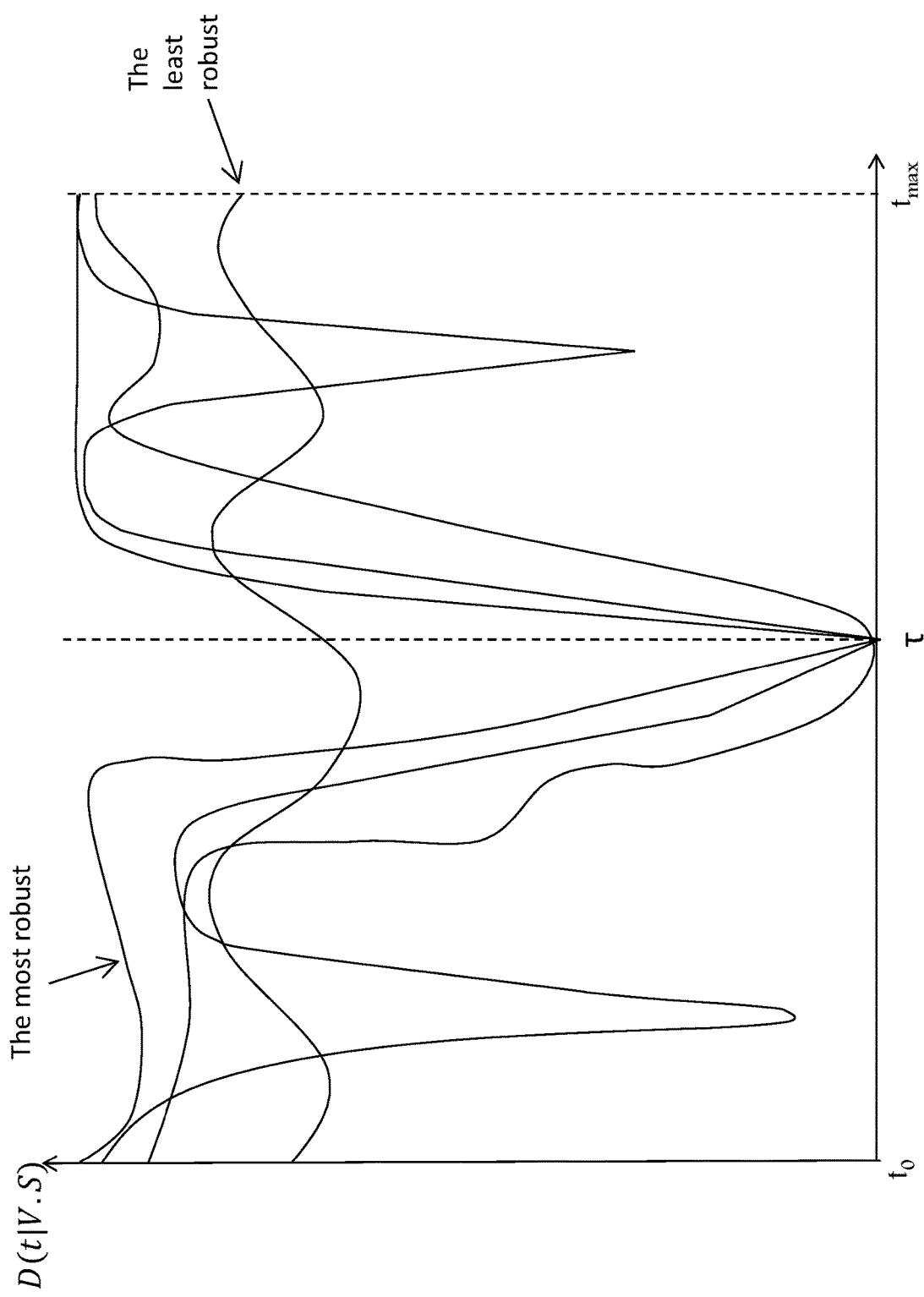
FIG. 7 shows a distance function of an acquired image.
Figure 8:
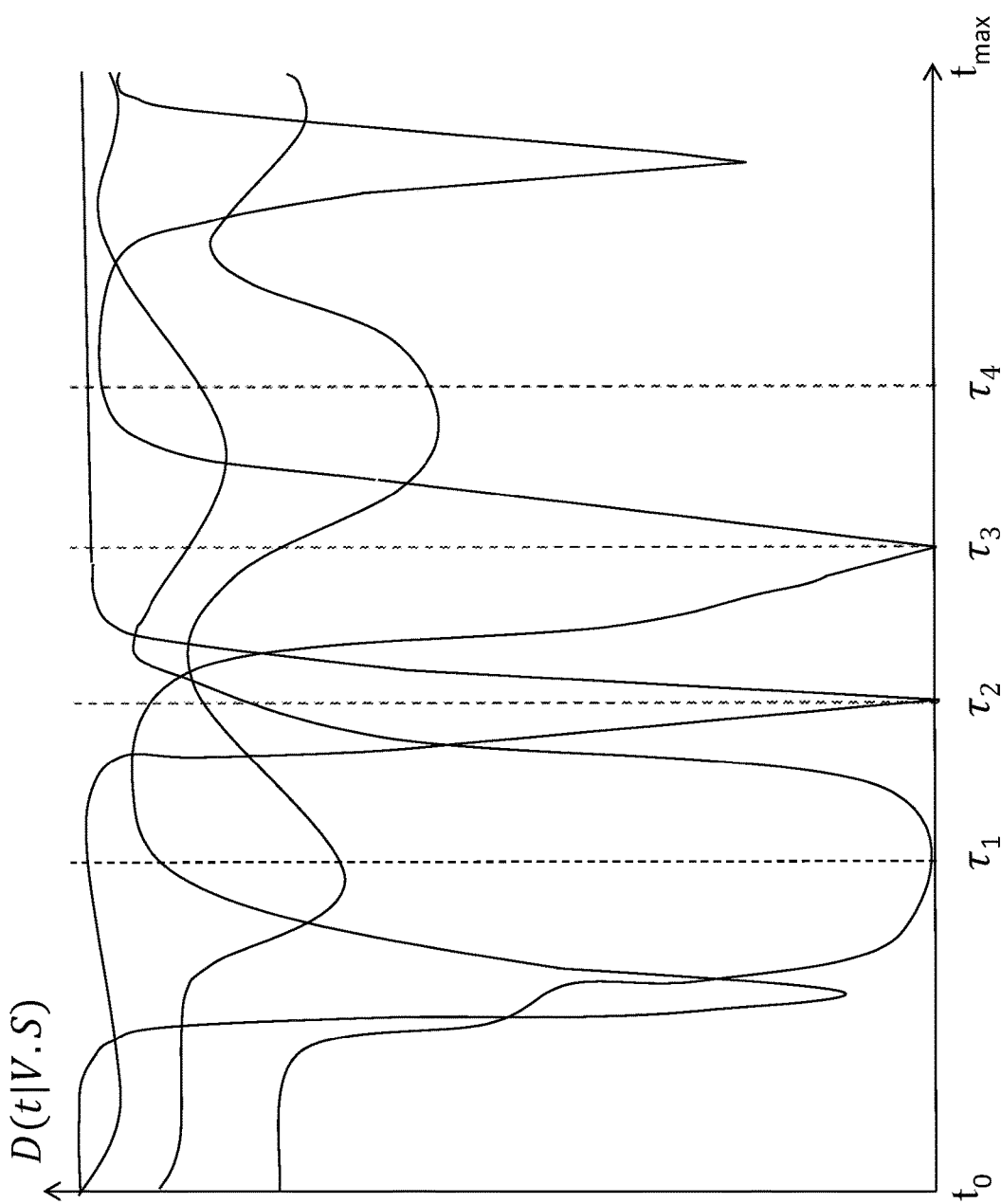
FIG. 8 shows a plurality of distance functions of a plurality of acquired images.
Figure 9:
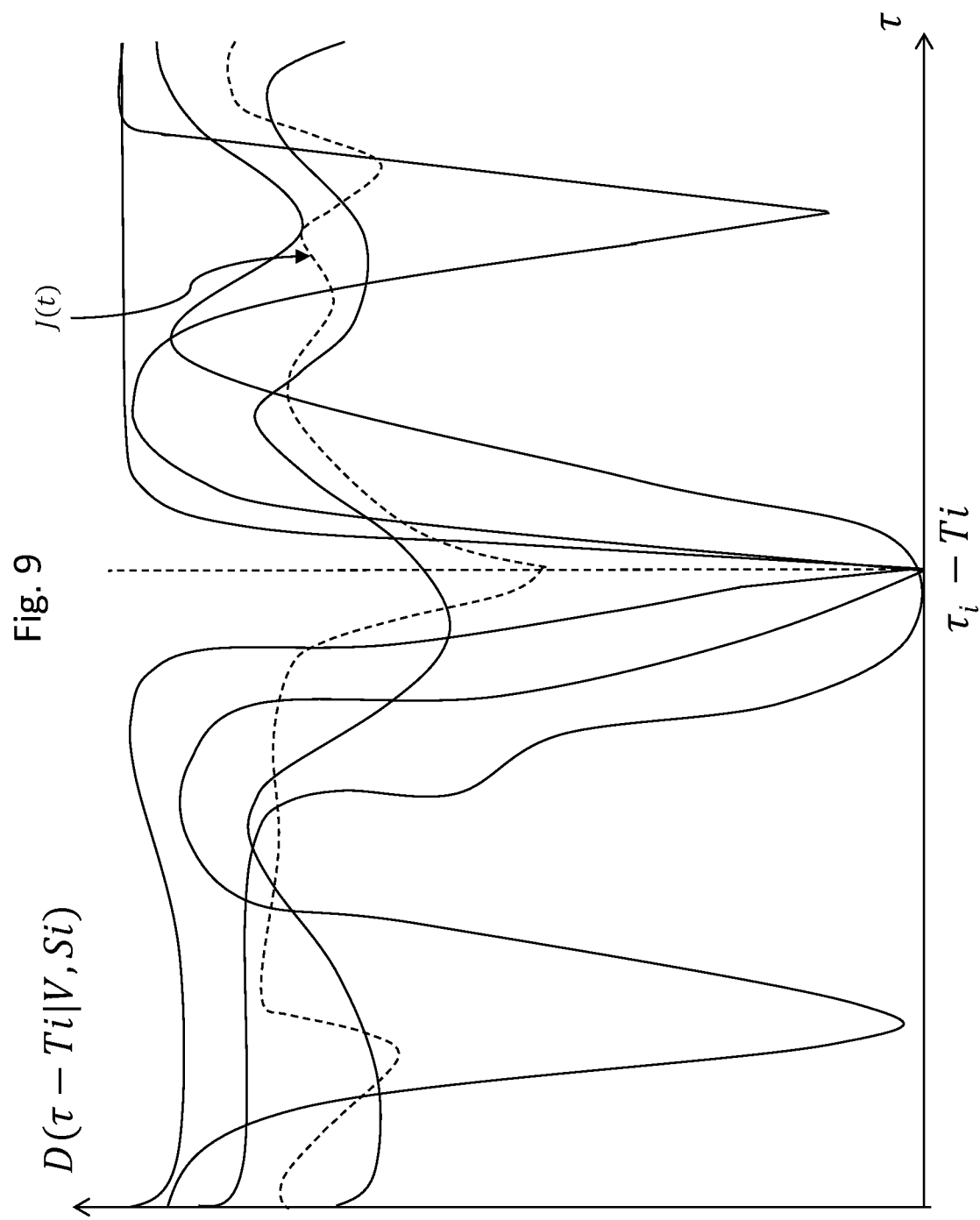
FIG. 9 shows a plurality of shifted distance functions for a plurality of acquired images.

FIGS. 7 and 8 look similar, but they cover different phenomena. FIG. 7 shows various possible distance functions for one abstract screenshot. This picture demonstrates only difference between more robust screenshots and less robust ones, e.g. a screenshot with various levels of noise.

In step 520 the image descriptor Si and timestamp Ti are stored as a new candidate point in the list of candidates. In step 522 an additional shifted distance function is calculated. Every new analyzed point leads to calculating some additional values of shifted distance functions. The method pre-calculates these additional values in a special tree-like structure for quick searching, adding and deleting. In step 524 the method verifies whether the count of candidate points in the list of candidate points is higher than a predetermined threshold. If the count of candidate points is lower than the pre-defined threshold, the most robust candidate point is searched and selected in step 528. In step 512 the timestamp T0 of the beginning of the video stream V(t) is estimated.

If the inventive method determines in step 506 that the input global descriptor is not valid, it verifies in step 508, whether the candidate list is empty. If the candidate list is empty, the inventive method returns an error code. If the candidate list is not empty, as determined in step 508, the method continues with step 512 with estimating the timestamp T0 of the beginning of the video stream V(t).

Figure 10:
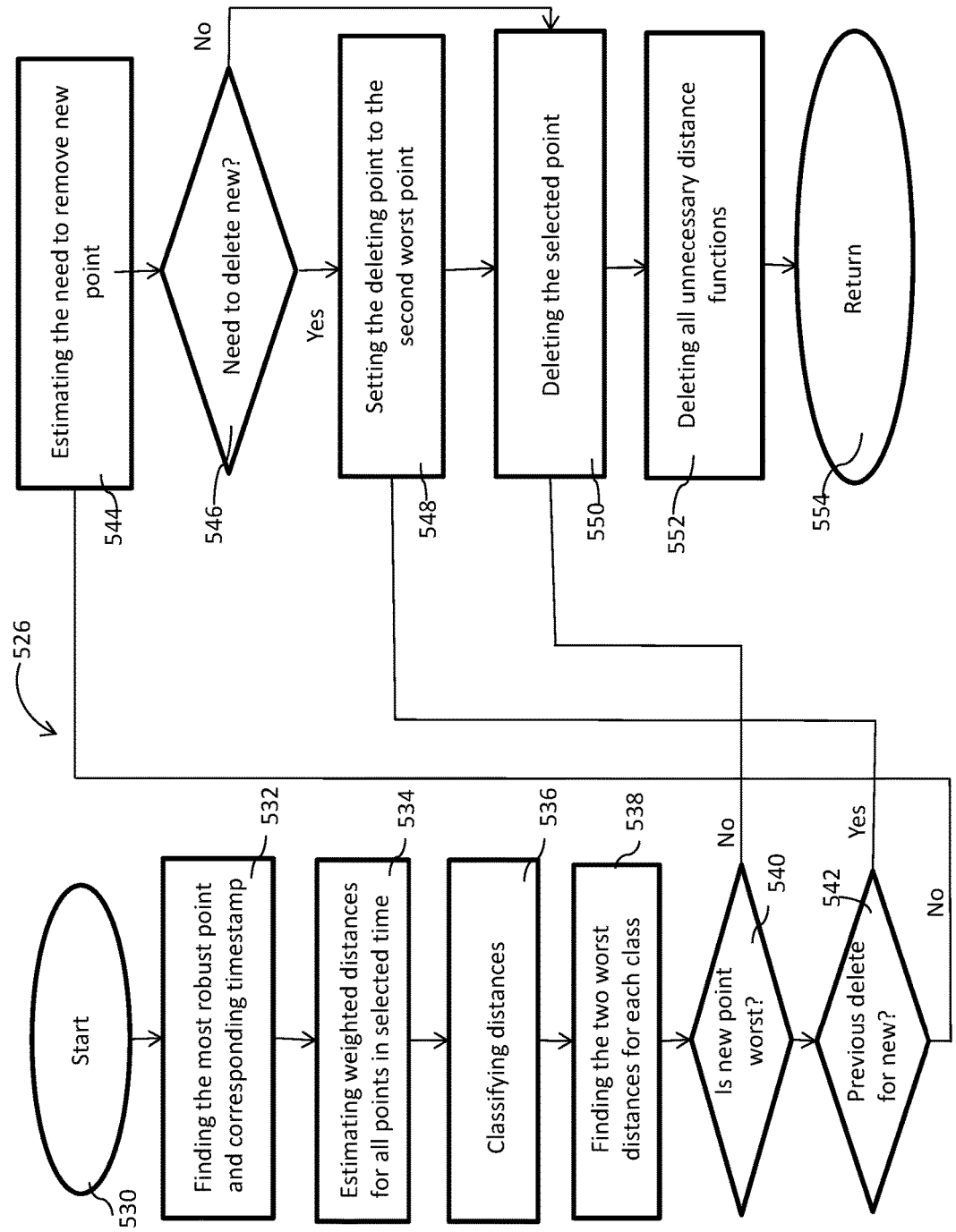
FIG. 10 shows a flow chart of the steps of removing candidate points.

In FIG. 10 the steps for removing the least robust point Si, Ti according to method step 526 in FIG. 6 are explained in further detail. The method steps for detecting the least robust point according to step 526 is sophisticated, first, the values of functions are analyzed, particularly the values of weighted distance functions (also called them "scores" in the algorithm at the retrieving stage). The method starts in step 530. In step 532 the candidate point having the highest robustness and the corresponding timestamp are determined. Thereafter, the weighted distances for all point in the selected time are estimated in step 534.

During processing an acquired image one embodiment of the method updates the candidate list. The embodiment adds a new point into the candidate set, and detect the least robust point. Thereafter, the method removes this point from the reference points. To increase the speed of calculations the method minimizes the functional J(t) in the discrete domain. The invention has discretized the video clip V(t) by uniform sampling and precalculating all VLAD descriptors at the preparation phase. For calculating J($t$) the invention searches k-nearest frames, and corresponding timestamps, for each acquired image. As result the method receives a quite small set of possible time values with minimal J(t). Then the embodiment of the method calculates J(t) for only these timestamp values.

Since the method according to the invention retrieves k-nearest frames for each screenshot, the method can estimate prior robustness score $w_i$ by analyzing the variance of retrieved timestamps. In one embodiment, the method use the inverse of the quasi standard deviation, calculated on the base of median with limited differences. These weights $w_i$ are treated as relative frequencies, and are accordingly normalized.

Thereafter, the distances (candidates, acquired images) are classified in step 536. A distance or acquired image is assigned to the best class (class 1), when Tx of the acquired image corresponds to the one-nearest frame. A distance or acquired image is assigned to the good class (class 2), when Tx corresponds to the k-nearest frame, but not to the one-nearest frame. All other distances, acquired images an/or candidates are assigned to the bad class (class 3).

Thereafter, the embodiment removes the least robust point primarily from the bad class of acquired images, then from the good class of acquired images, then from the best class of acquired images and so on. This is necessary because a direct comparison of values of distance functions for different screenshots is not always correct. A point can be robust enough but has large value of distance function by virtue of the construction of VLAD descriptors. The embodiment has a special heuristic to prevent frequent removal of a point that has just been added. The last added point is deleted no more than every second time. This is necessary in order to compensate for the inaccuracy of the model, namely, the fact that the inventors believe that the rates of time in the visualizer, and observing time reference systems, are the same. Also some of the query images may not correspond to any frames of the video stream (because of errors of the observing system).

In step 538 the two worst distances are determined in each of the three classes. If it is determined in step 540 that the new point Si, Ti is the worst point in the respective class, it is verified in step 542, whether the previous new point has been deleted from the list of candidates for a new candidate. If the previous new point has not been deleted, the method continues with step 544 and estimates, whether the new point Si, Ti has to be deleted. If the method determines in step 546 that the new point has to be deleted, the method continues to step 548 and sets a deleting indicator to the second worst point in step 548. In step 550 the selected point is deleted from the list of candidate points. In step 552 all unnecessary distance functions are deleted, such as the distance function relating to the removed point. If the method determines in step 546 that it is not necessary to delete the new point, the method continues with step 550 and deletes the selected point. The selected point may be the least robust, but sometimes the selected point may be the second least robust. It's a selected point for deleting.

If the method determines in step 540, that the new point is not the worst point, the method continues with step 550 and deletes the selected point in step 550. As mentioned above, the selected point may be the least robust, but sometimes the selected point may be the second least robust. It's a selected point for deleting.

If the method determines in step 542 that the previous new point has to be deleted for the new point, the method continues to step 548 and sets the deleting indicator to the second worst point.

Augmented information 204, 206 can be displayed on the screen 202 of the observing unit 200, if a timestamp t of the original video stream as determined by the inventive method corresponds to the information.

It is an advantage of the present invention that the mobile unit can estimate the timestamp of image acquired from the original video stream V(t) without any need that the observing unit 200 has to monitor the original video stream from the beginning.

The invention claimed is:

1. A method for determining a timestamp t of an image of a video stream V(t) comprising a plurality of images, said method comprising the following steps:
receiving a plurality of original image descriptors at a monitoring unit, wherein each original image descriptor is associated to an image in the original video stream and wherein the original image descriptors are generated during preparation phase;
displaying the original video stream V(t) on a display device during a display phase;
acquiring an acquired video stream by an acquisition device of the monitoring unit by acquiring images Si of the display device on which the original video stream V(t) is displayed;
determining an acquired image descriptor of at least a portion of at least one of a plurality of acquired images S of the acquired video stream during the display phase;
determining a similarity level of an original image descriptor and the acquired image descriptor; and
if the similarity level of the original image descriptor and the acquired image descriptor fulfills at least one criterion, determining the timestamp t of the original image descriptor and assigning the timestamp t to the acquired image corresponding to the acquired image descriptor as an estimated timestamp T.

2. The method according to claim 1, further comprising the step of
determining the uniqueness level of the acquired image;
storing the acquired image descriptor and the estimated timestamp T as a candidate point in a list comprising a plurality of candidate points;
if the number of candidate points exceed a predetermined number, removing the candidate point with the lowest uniqueness level from the list.

3. The method according to claim 1, wherein the step of determining the uniqueness level $\omega i$ of the acquired image descriptor includes the step of comparing the acquired image descriptor with the acquired image descriptors of a plurality of neighboring acquired images.

4. The method according to claim 3, further comprising the steps of
determining the candidate point of all candidate points in the list with the highest uniqueness level $\omega i$; and
determining the timestamp t based on basis of the candidate point having the highest uniqueness level $\omega i$.

5. The method according to claim 3, wherein the step of determining the uniqueness level of a $\omega i$ of the acquired image descriptor of the acquired image includes at least one of the following steps:
analyzing the variance of the timestamp Ti associated to the acquired image Si;
determining the inverse standard deviation of the timestamp Ti associated to the acquired image Si;
determining the inverse standard deviation of the timestamp Ti associated to the acquired image Si based on the median of the timestamp Ti associated to the acquired image Si.

6. The method according to claim 1, further comprising the following step:
determining the timestamp TO of the starting point of acquired video stream by the formula TO=T*−t*;
wherein
T* is the timestamp of the acquired image; and
t* is the timestamp of the corresponding original image.

7. The method according to claim 6, further comprising the following step:
determining the timestamp TO of the starting point of acquired video stream by the formula TO=T*−t*;
wherein
T* is the timestamp of the acquired image corresponding to the candidate point having the highest uniqueness level; and
t* is the timestamp of the corresponding original image.

8. The method according to claim 7, wherein the uniqueness level is
determined by the step of calculating a distance function Di(t|, V(t), Si), wherein
t is the timestamp in the original video steam;
V(t) is the original video steam; and Si is the acquired image.

9. The method according to claim 8, further comprising the step of
determining the candidate point (S*, T*) having the highest uniqueness level of all candidate points (Si, Ti, i=1, . . . , n) by the step of minimizing the functional;
$J(t) = \Sigma \, \omega i \, Di(t|V(t), Si)$, i=1, . . . , n;

wherein

S* is the image having the highest uniqueness level of all candidate points;

T* is the timestamp of the image having the highest uniqueness level of all candidate points;

Si is the image i; and

Ti is the timestamp of the image i.

10. The method according to claim 1, wherein the step of determining an acquired image descriptor comprises at least one of the following steps:

performing an image histogram equalization;

detecting local feature points;

calculating local feature descriptors;

calculating a vector of locally aggregated descriptors; and/or decreasing the dimension of the locally aggregated descriptors.

11. The method according to claim 1, further comprising at least one of the following steps:

detecting the corners of the display device by image processing;

detecting the orientation of the display device by determining the orientation of the mobile unit by gyroscopic data of the mobile unit;

detecting the edge of the display device by image processing;

determining the orientation of the display device by image processing;

transforming the orientation of the captured images of the captured video stream to the orientation of the mobile unit;

extracting the acquired image of the acquired video stream from the captured image of the captured image stream, wherein the acquired image corresponds to the portion of the captured image that depicts the original video stream.

12. The method according to claim 1, wherein the original video stream is a television signal stream;

the original video stream is a broadcast signal;

the original video stream is a multicast signal;

the display device is a television set;

the display device is a display monitor;

the monitoring unit is a mobile computer and the acquisition device is a camera of the mobile computer;

the monitoring unit is a tablet computer and the acquisition device is a camera of the tablet computer;

the monitoring unit is a smart phone and the acquisition device is a camera of the smart phone; and/or the monitoring unit are data glasses and the acquisition device is a camera of the data glasses.

13. A method of augmenting a displayed video stream by displaying information, comprising the following steps:

determining a timestamp t of an image of an original video stream V(t) according to claim 12;

receiving at the mobile unit at least one information that is to displayed at least one display timestamp td of the original video stream V(t); and displaying the information at the mobile unit, if the mobile unit determines that the image corresponding to the display timestamp td of the original video stream V(t) is displayed on the display device.

\* \* \* \* \*